United States Patent

Martinage et al.

Patent Number: 5,445,040
Date of Patent: Aug. 29, 1995

[54] CAGING SYSTEM

[75] Inventors: Louis H. Martinage, Reading; Edward M. Cusson, Winchester; Penn H. Clower, Andover, all of Mass.

[73] Assignee: The United States of America as represented by the Secretary of the Navy, Washington, D.C.

[21] Appl. No.: 247,162

[22] Filed: May 20, 1994

[51] Int. Cl.$^6$ ............... G01C 19/30; G05B 13/00
[52] U.S. Cl. .................. 74/5.46; 74/5.41; 74/56 E; 318/561
[58] Field of Search ........ 74/5.1, 5.46, 5 F, 5.41, 74/5.5, 5.6 E; 318/561

[56] References Cited

U.S. PATENT DOCUMENTS

| | | | |
|---|---|---|---|
| 3,077,785 | 2/1963 | Stiles | 74/5 F X |
| 3,229,532 | 1/1966 | Langley | 74/5.1 |
| 3,250,135 | 5/1966 | Minihan | 74/5.1 |
| 3,473,391 | 10/1969 | Williamson | 74/5.1 |
| 3,577,646 | 5/1971 | Eklund | 74/5.5 X |
| 3,845,995 | 11/1974 | Wehde | 74/5.46 X |
| 3,926,060 | 12/1975 | Gillies | 74/5.1 |
| 4,125,799 | 11/1978 | Harduvel | 318/621 |
| 4,193,308 | 3/1980 | Stuhler | 74/5.22 |
| 4,322,984 | 4/1982 | Lasker | 74/5.1 |
| 4,563,909 | 1/1986 | Carroll et al. | 74/5.5 |
| 4,694,229 | 9/1987 | Cormack | 318/561 |
| 4,811,613 | 3/1989 | Phillips et al. | 74/5 F X |
| 4,823,626 | 4/1989 | Hartmann et al. | 74/5.6 E X |
| 4,986,139 | 1/1991 | Rennie | 74/5.6 E X |
| 5,105,669 | 4/1992 | Gruber | 74/5.46 |

*Primary Examiner*—Rodney H. Bonck
*Attorney, Agent, or Firm*—John P. Tarlano; Darrell E. Hollis

[57] ABSTRACT

A caging system for a magnetized rotor of a gyro. A capacitive detector detects amounts of linear deflection of the rotor, from an upright position, over time. A computer calculates the linear deflection velocity of the rotor. A power supply sends an amount of current to an electromagnetic coil dependent on the amount of linear deflection velocity of the rotor. An electromagnetic field from the electromagnetic coil moves the rotor to an upright position.

12 Claims, 3 Drawing Sheets

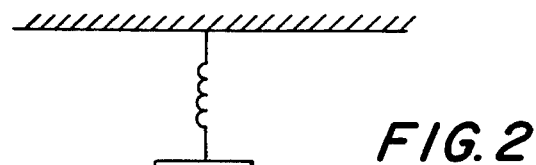
FIG. 2
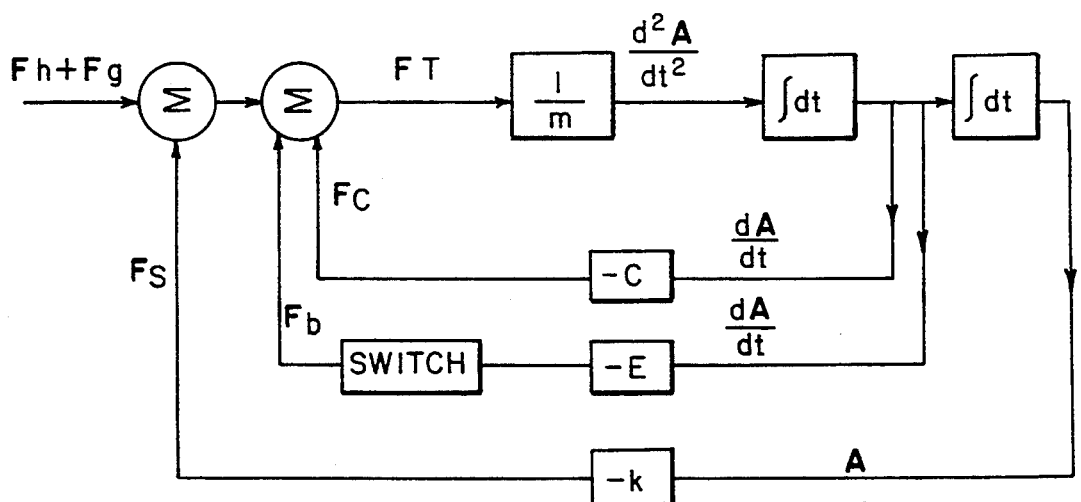
FIG. 1
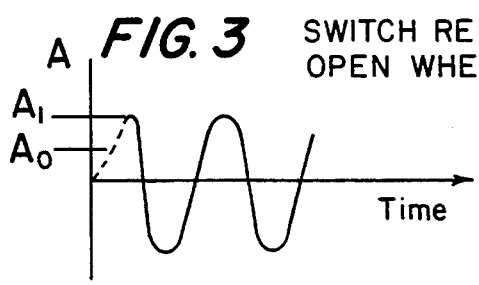
FIG. 3 SWITCH REMAINS OPEN WHEN A=Ao
FIG. 4
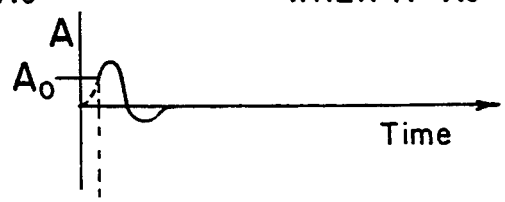
FIG. 5 SWITCH CLOSES WHEN A=Ao
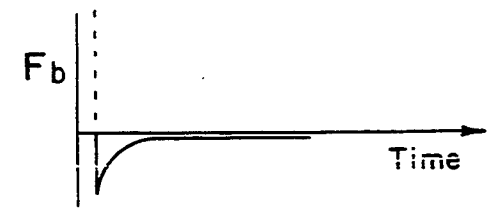
FIG. 6

CAGING SYSTEM

FIELD OF THE INVENTION

The present invention relates to a caging system that cages a moving body.

BACKGROUND OF THE INVENTION

In the past, various means have been used to cage a gyro gimbal. U.S. Pat. No. 4,193,308 suggests the use of automatic brakes, solenoids or dampers to cage a gyro gimbal. These devices are placed in physical contact with the gyro gimbal.

U.S. Pat. No. 4,322,984 shows a mechanical locking means that cages a rotor of a gyro. The locking means is not dynamic. That is, the locking means does not immediately respond to sidewise movement of the rotor. Further, the locking means is placed in physical contact with the rotor.

BRIEF DESCRIPTION OF THE INVENTION

The disclosed system is used to remotely cage a a body, such as a rotor of a gyro. The body could be moving, sidewise deflecting, or vibrating. A caging means remotely applies a caging force Fb, having an adjustible value, to the body to cage the body. The caging means is not in physical contact with the body. That is, the caging means is remote from the body and the caging means remotely applies a caging force to the body.

The magnitude of the caging force, Fb, is made equal to a selected value of a caging coefficient, E, times an instantaneous value of the velocity, dA/dt, of the body. Fb = −E (dA/dt). Fb is adjustable since the value of E is selectable.

A rotor of a gyro can be deflected out of the normal plane of the rotor due to a bumping of the gyro. Such deflection is remotely detected by a deflection detector means. The instantaneous velocity of the rotor is calculated based on the remotely detected deflections. Such a deflection can occur since a shaft that is used to hold the rotor onto a gimbal of the gyro is flexible. Such a flexible shaft is used to correct for rotational behavior of a rotor-gimbal combination.

The disclosed system remotely applies the caging force Fb in a direction that is opposite to the direction of the instantaneous velocity of a rotor. The rotor would be moving on a flexible springy shaft of a gyro assembly. Again, such movement of the rotor, and flexing of the flexible springy shaft, might be produced due to a jolt or jarring to the gyro assembly during transportation of the gyro assembly.

The maximum value of deflection can be decreased by a powered caging means that remotely applies the caging force Fb to the rotor. Such a caging force Fb is applied in a direction that is opposite to the direction of the instantaneous velocity of the rotor.

The disclosed system dynamically retards deflection of a rotor that might be produced due to a jolt or jarring to the gyro assembly. The deflection of the rotor is dynamically decreased by a caging means that remotely applies an adjustable value of a caging force to the rotor in a direction that is opposite to the direction of the instantaneous velocity of the rotor.

The disclosed system will prevent stop knock of the rotor of a gyro assembly. Stop knock is a condition wherein a sidewise deflection will cause a rotor to hit a stopping structure in the gyro assembly. Stop knock can occur due to a jolt of a gyro assembly. There will be little or no damage to a rotor of a gyro, that has a flexible springy shaft, by use of the disclosed system.

The caging system of the present invention dynamically retards deflection of a rotor of a gyro assembly. Such retardation occurs because the moving non-spinning rotor is made to do work in the presence of the caging force. Such work will occur when a caging force is remotely applied in a direction that is opposite to the direction of the instantaneous velocity of the rotor. The amount of work done by the rotor equals the strength of the caging force times the distance that the rotor moves through the remotely applied caging force. The strength of the caging force is adjusted by adjusting the value of the caging coefficient E. A decrease in the deflection of the rotor then takes effect. Thusly, damage to the rotor of the gyro assembly is minimized or prevented.

The disclosed caging system is within a larger field of study called servomechanisms. Servos are electromechanical machines which use feedback techniques to intelligently control a mechanical motion. Generally, the drive-to-force producer, such as a motor or solenoid, is manipulated to obtain the desired mechanical result, such as the precise rotation of a radar antenna. Intelligence is involved because the end result is measured and compared with the desired motion. Any difference is amplified and used to change the level of the drive power to the force producer so that the error is corrected. As an example, the drive power to a radar antenna may be automatically and continuously varied so that the rotational speed is constant and independent of the effects of wind, rain, or snow.

The accuracy of a servo is ultimately limited by the accuracy of the feedback sensing device—the thing that actually measures the mechanical parameter. The dynamic performance of the servo, that is, the speed and accuracy with which it responds to command changes, e.g. mechanical disturbances, depends in a large part of the design of what is called the compensator.

Compensators are important to servo systems. A computer is one type of compensator that could be used in the disclosed gyro caging servo, or caging system.

The compensator is the "brain" of the servo. A "brain" is a circuit or computer which reads the error signal and decides what to do with the actuator drive level. Compensation design is involved in constructing a servo. Often the measured parameter is not something one can directly control.

For example, the speed of a car is not directly set by the position of the gas pedal. The pedal position sets the torque applied to the wheels in a rather complicated way. This is because torque varies with engine and vehicle speed. That torque then changes the car's speed in a manner that depends on the vehicle weight and road conditions. With the proper compensation it is possible to design an excellent cruise control, and that design can then be realized by a variety of different techniques.

Many years ago servo compensators were usually designed with common electronic components, for example amplifiers, transformers, capacitors, etc. Now it is quite common to see digital computers used to implement the same mathematics. The choice is an economic one; it really has little to do with the calculations involved.

In the embodiment of a caging system disclosed below, a digital computer was used. In many applications it would be much cheaper to do the simple compensation required with an inexpensive handful of analog components. The parts necessary to do the caging could be purchased for a small amount of money. A digital computer is not required in the caging system of the present invention.

Dynamic remote caging is discussed below. Consider FIG. 1, a diagram of forces at work on a spring-mass oscillator in air. A mass m, which may be the mass of a gyro rotor, is to be caged by an adjustable caging force Fb.

In FIG. 2, a spring has a mass m on the end. The mass is free to move, subject to the spring force Fs and some drag force Fc provided by the air (or other medium) around it. It's a good model for what occurs to an uncaged rotor that is inside a gyro.

In FIG. 1 the mass m is initially hit by a hitting force Fh. The hitting force Fh causes the mass m to swing, producing a spring force Fs. Then the mass is acted on by the spring force Fs and a non-adjustable drag force Fc. Fc is due to air resistance. $Fc = -C (dA/dt)$. A is the instantaneous linear deflection vector of the mass, e.g. a rotor. $(dA/dt)$ is the instantaneous linear deflection velocity vector of the mass, which may be a rotor. C is a non-adjustable constant that is a function of the air resistance.

Fg is the force due to gravity, on mass m. $Fg = mg$. g is the gravitational vector. The gravitational force Fg is always downward, that is, positive.

These forces produce a total force F1, before a caging force Fb is remotely applied to mass m. $F1 = Fh + Fs + Fc + Fg$. The total force F1 is divided by the mass m, to get the resulting instantaneous linear acceleration $(d^2A/dt^2)$ of mass m. $(d^2A/dt^2)$ can be integrated to get the instantaneous linear deflection velocity vector $(dA/dt)$.

When the switch of FIG. 1 is closed, a caging force Fb is remotely applied to mass m. Fb is made to be equal to $-E (dA/dt)$. That is, the strength of the caging force Fb is made negatively proportional to an adjustable caging coefficient E times the instantaneous linear deflection velocity vector of the mass, $dA/dt$. E is adjusted, that is selected, in order to apply a desired level of a caging force Fb to mass m. Again, the selectively adjustable value of E is chosen so as to produce a desired strength of a caging force Fb. Fb is a movement retarding force.

The new total force F2 on mass m will now include caging force Fb. Then $F2 = Fh + Fs + Fc + Fb + Fg$. The total force F2 is divided by the mass m to get the instantaneous resulting linear acceleration. $(d^2A/dt^2)$ of mass m.

Again, the linear acceleration of the mass, $(d^2A/dt^2)$, can be integrated over time t to give the instantaneous linear deflection velocity vector $(dA/dt)$. Fb equal minus E times $(dA/dt)$.

As explained, the faster the mass m travels, the greater will be the drag force Fc and the greater will be the applied caging force Fb. Fb is adjustable dynamically since E is adjustable dynamically, to provide a desired level of dynamic caging.

The spring force Fs is obtained by integrating the mass's linear deflection velocity $(dA/dt)$ over time to describe the mass's instantaneous deflection vector A. As the mass moves downward, the spring stretches. This action produces a spring force Fs which acts against force Fh. Accordingly, the linear deflection vector A must be multiplied by a spring constant (k) to generate spring force Fs. Then, $Fs = -kA$. Spring force Fs is a restoring force which is subtracted from the external forces $Fh + Fg$, acting on the mass m.

The model of FIG. 1 can be examined mathematically to predict what the mass m will do under various circumstances. For example, if the mass is hit by hitting force Fh, the mass will behave as sketched in FIG. 3, before a caging force Fb is applied. FIG. 4 shows hitting force Fh. The total movement retarding force is very slight, (i.e. low drag force and no caging force applied). The mass m will bob back and forth for a relatively long time.

If the total retarding forces were very large (the whole system is placed under water, for example) the mass would return slowly to the center position and not oscillate appreciably. This behavior is known as heavy damping. This action would also occur if E is large when the switch of FIG. 1 is closed.

FIG. 5 shows the effect of mode rate damping. E is adjusted for moderate damping, as further discussed below. The switch is closed when $A = Ao$.

FIG. 6 shows the remotely applied caging force Fb after the switch is closed.

Again, FIG. 5 shows the response of mass m to hitting force Fh before and after a caging force Fb, shown in FIG. 6, is remotely applied to mass m. The deflection vector for the mass m is Ao when the switch of FIG. 1 is closed, to dynamically apply an adjustble caging force Fb, shown in FIG. 6.

In the non-spinning gyro of FIG. 7, the deflection vector A of the rotor is read out over time to find $(dA/dt)$. $(dA/dt)$ and the selected value of E together control caging force input Fb. The goal is to effectively increase the total movement retarding forces $Fb + Fc$. This is certainly possible because the caging force Fb is no different from the drag force Fc, as far as the mass is concerned.

If the mass's deflection velocity vector dA/dt were directly available, the task would be easy: simply make the applied caging force negative in a selected proportion to the observed velocity vector. Unfortunately the back and forth velocity vector $(dA/dt)$ of the rotor is not directly available for measurement. One can recreate back and forth deflection velocity vector $(dA/dt)$ by sensing the deflection vector A of the rotor over time.

A compensator is needed to cage a non-spinning gyro rotor to produce a caging force opposite in sign but otherwise ajustibly proportional to the derivative of the measured deflection vector A. This is done independently for each of the two axes that are along orthogonal mass directions. The equation for each is: $Fb = -E (dA/dt)$ where Fb is the applied caging force, E is the gain that is adjustibly set to adjust the caging force Fb and dA/dt is the measured instantaneous deflection velocity vector of the mass.

How the differentiation of the deflection vector A of the mass gets accomplished is somewhat dependent on the means chosen. A computer might calculate the derivative of the deflection vector by differencing past values of the measured deflection vector A over time. An analog circuit would do it with a properly designed filter. Broadly, the compensator calculates mass velocity from mass deflection over time and then generates an adjustable caging force Fb that is adjustibly proportional to the deflection velocity vector.

SUMMARY OF THE INVENTION

A caging system that cages a moving body, comprising means for remotely detecting amounts of movement of the body over time, means for determining an instantaneous velocity of the body from such detected amounts of movement of the body over time, and means for remotely applying a caging force to the moving body in a direction opposite to a direction of movement of the moving body, the magnitude of the caging force being equal to a selected value of caging coefficient times the instantaneous velocity of the moving body.

DESCRIPTION OF THE DRAWINGS

FIG. 1 is a circuit type diagram of forces on a mass being caged.

FIG. 2 is a view of a mass suspended by a spring.

FIG. 3 is a trace of deflection of an uncaged mass with time.

FIG. 4 is a trace of a jolt force on a mass with time.

FIG. 5 is a trace of deflection of a caged mass with time.

FIG. 6 is a trace of a caging force on a mass with time.

DESCRIPTION OF THE PREFERRED EMBODIMENT

Figure 7:
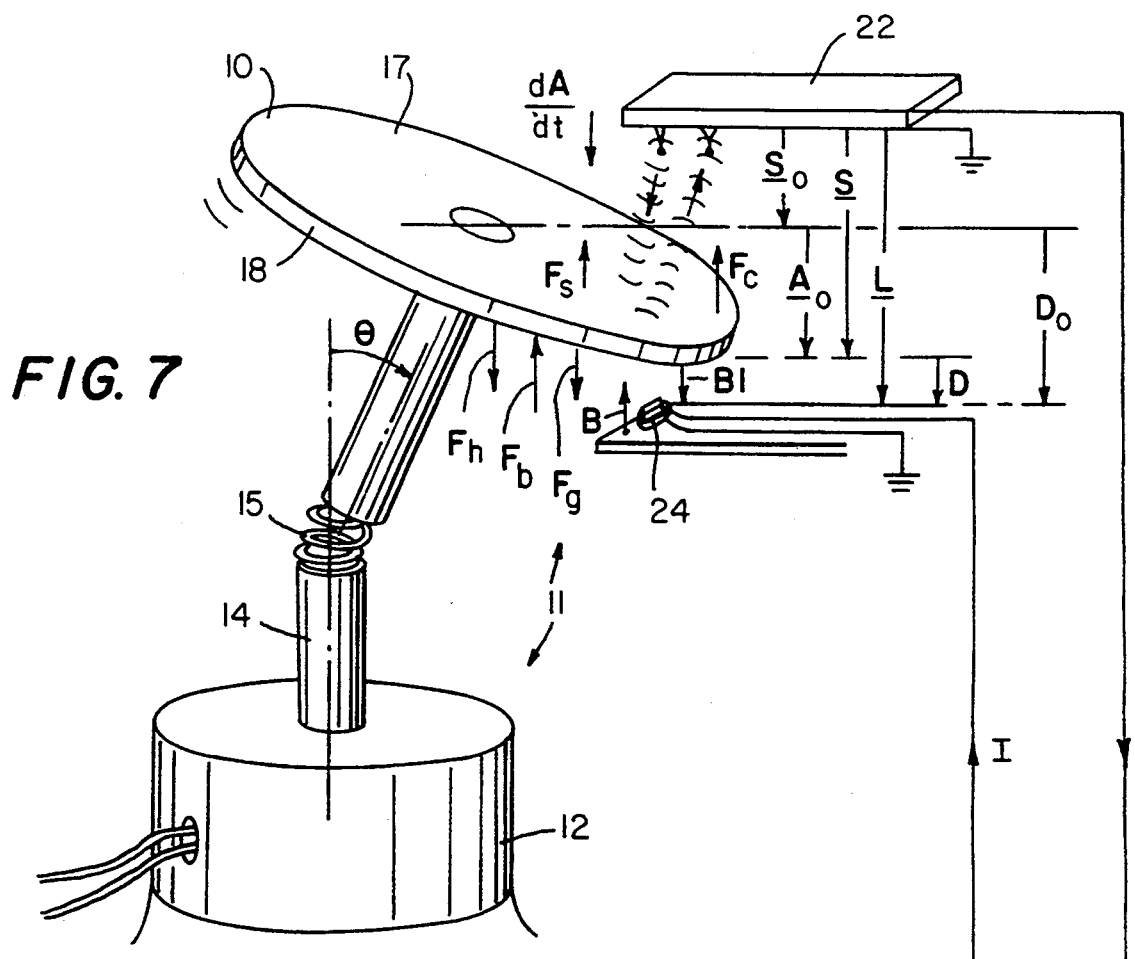
FIG. 7 is a view of a caging system that cages a rotor.

FIG. 7 shows a caging system that remotely cages a moving body. In FIG. 7, caging system 8 cages metal rotor 10 of a gyro assembly 11. The non-spinning metal rotor 10 can be rotated by a motor 12. The motor 12 would ride on a gimbal (not shown) of gyro assembly 11. The rotor 10 is solid internally. The rotor 10 rides on a flexible springy shaft 14. The metal rotor 10 is magnetized so that its upper portion 17 is a south magnetic pole and its lower portion 18 is a north magnetic pole. The rotor 10 has a mass m.

The flexible springy shaft 14 will bend and allow rotor 10 to deflect downward or upward from a rest position during a jolt to the gyro assembly 11. The rotor 10 is shown as deflecting downward due to a hitting force Fh. A deflection vector Ao is produced. The deflection is made possible by a flexible springy joint 15. A deflection vector A is produced while rotor 10 is not spinning. A deflection vector A is produced due to application of a jolting or hitting force Fh on the gyro assembly 11. If not stopped by a caging system 8, the rotor 10 could deflect enough to strike a mechanical stop (not shown) in the gyro assembly.

A spring force Fs is produced due to a deflection vector A. The spring force is equal to $-kA$.

The caging system 8 will produce a caging force Fb, to cage rotor 10 as it deflects.

An amount of deflection of rotor 10, toward or away from deflection detector 22, is remotely detected by detector 22. Detector 22 is remote from rotor 10 since detector 22 is not in physical contact with rotor 10. Detector 22 is an example of a detector means, that is, a deflection detector means, for remotely detecting amounts of movement of rotor 10 over time.

The detected magnitude and direction of deflection vector A of rotor 10 is that amount and direction of deflection of rotor 10 that is toward or away from detector 22. The deflection detector 22 is a part of caging system 8. Detector 22 remotely measures distance vector S. So is a distance vector between detector 22 and rotor 10, when rotor 10 is not deflected. Therefore $A = S - So$.

The deflection detector 22 is shown as a capacitive type of deflection detector. Such a detector 22 can indirectly measure the magnitude of deflection vector A of rotor 10, by remotely sensing the capacitance between detector 22 and rotor 10.

Alternatively, the detector 22 could be a laser detector or acoustic detector. The times of travel of light pulses or acoustic pulses between detector 22 and rotor 10 could alternatively be used, to determine the magnitude of deflection vector A.

The detector 22 can be used to detect the magnitudes A1, A2, A3 etc. of deflection vectors A1, A2, A3 etc. of rotor 10 at periodic intervals of time t1, t2, t3, that is over a span of time.

Computer 26 used values A1, A2, A3 etc. in order to calculate the amount and direction of the instantaneous deflection velocity vector dA/dt of rotor 10. Thus, $dA/dt = (A2 - A1)/(t2 - t1)$ and $dA/dt = (A2 - A1)/(t2 - t1)$ during the time between t1 and t2. dA/dt is the magnitude of vector dA/dt. Computer 26 is an example of a means for determining instantaneous velocity of rotor 10.

Below the rotor 10, and on a verticle axis, is an electromagnet 24 of caging system 8. The electromagnet 24 is remote from rotor 10, that is electromagnet 24 is not in physical contact with rotor 10. Electromagnet 24 is an example of a remote caging means for caging rotor 10. A coil of electromagnet 24 is wound in a clockwise direction, looking downward on electromagnet 24, in FIG. 7. The electromagnet 24 is positioned a vector distance L away from detector 22.

D is the vector distance between electromagnet 24 and rotor 10. D equals Do when rotor 10 is at rest. Do is the length of vector Do. Further Do equals $L - So$ and D equals $L - S$.

After gyro assembly 11 is bumped, jolted or jarred, the magnetic rotor 10 begins moving, for example, downward. The rotor 10 moves a vector distance Ao, at which distance caging force Fb is remotely applied to rotor 10. At vector distance Ao, the rotor 10 is still moving downward due to hitting force Fh. The maximum value of a deflection vector that rotor 10 would have, if no caging force were applied, is A1.

The maximum value of a deflection A for rotor 10 decreases after caging force Fb is remotely applied. The caging force Fb is equal to $-E(dA/dt)$. The caging force Fb is applied to rotor 10 in a direction opposite to the the direction of the instantaneous linear deflection velocity vector dA/dt of rotor 10. The value of the caging force is proportional to the instantaneous velocity of the rotor and to the value of adjustable caging coefficient, E.

If a moderate caging force Fb is used, the linear deflection vector A of rotor 10, from detector 22, is described according to the equation $A = [A0 \, COSINE(ft) + H \, SINE(ft)] \, e^{-((C+E)/2m)t}$. A caging force Fb and drag force Fc retard rotor 10 from moving. Drag force Fc equals $-C(dA/dt)$. k is the spring constant of flexible shaft 14. m is the mass of rotor 10. f is the frequency of oscillation of rotor 10. f equals square root of $k/m - (C+E)^2/4m$. $H = [P + (A0((-C+E)/2m))]/[(f)]$. t is the instantaneous time. A is the deflection vector of rotor 10 over time;. The deflection vector for rotor 10 is Ao, when caging force Fb is applied. The rotor 10 has velocity P when caging force; Fb is applied, at time t0.

In FIG. 7, the velocity of the rotor 10 is downward-(positive) at initial time t0, that is when Fb is first applied. Deflection vector Ao is caused by a bump or jar. E is a measure of the strength of the caging force Fb applied to rotor 10, to cage rotor 10. C is a measure of the drag force due to air resistance. Moderate caging is used in the rotor response shown in FIG. 5.

For light caging of rotor 10, E is adjusted so that $(C+E)^2/4m$ is much smaller than $k/m$. For moderate caging of rotor 10, E is adjusted so that $(C+E)^2/4m$ is somewhat smaller than $k/m$. For heavy caging of rotor 10, E is adjusted so that $(C+E)^2/4m$ is larger than $k/m$.

The response of a mass m to a non-adjustible drag force Fc, is presented in the literature. Section 87 of "Mathematics For Engineers And Physicists" by Ivan S. Sokolnikoff and Elizabeth S. Sokolnikoff, First Edition, discloses the effects of such a non-adjustible damping force. That book was published in 1934 by McGraw-Hill Book Company, Inc. and is incorporated herein by reference. The drag force Fc is the non-adjustible and passive damping force referred to in section 87.

The rotor 10 has a distance vector D to electromagnet 24. Detector 22 has a distance vector L to electromagnetic 24. $D=L-So-A$. After a bump or jar, and while a caging force Fb is applied to rotor 10, the vector distance D is described by the equation $D=L-So--[A0\ COSINE(ft)+H\ SINE(ft)]\ (e-((C+E)/2m)t)$. The rotor 10 is at a vector distance $Do=L-So$ from electromagnet 24 when rotor 10 comes to a rest position. The maximum value of deflection vector A decreases while a caging force Fb is applied.

The instantaneous deflection velocity vector dA/dt of the rotor 10, with respect to detector 22, is equal to velocity vector V. During a bump or jar, a caging force Fb is applied to rotor 10. The maximum value of deflection vector A is thus decreased by force Fb. Fb is in a direction opposite to velocity vector V. The sign of velocity vector V tells the direction of motion with respect to detector 22. When rotor 10 moving toward detector 22, V is negative. When rotor is moving away from detector 22, V is positive. (dA)/(dt) is the derivative of A with respect of time t. The velocity, V, of rotor 10 is the result of an energy being imparted to the rotor 10 due to a bump or jar force Fh applied to the gyro assembly 11 and then the result of applied caging force Fb.

The kinetic energy of the rotor is described by the kinetic energy function $(\frac{1}{2})$ (m) (V squared). When the rotor 10 starts to oscillate, after it is stopped from moving downward, its mechanical energy decreases with time.

A total mechanical force F2 is produced on rotor 10 at time to. F2 equals $Fh+Fs+Fb+Fc+Fg$ as shown in FIG. 7. As rotor 10 is slowing in its downward movement, total mechanical force F2 on the rotor is negative and is equal to $Fh-k\{[A0\ COSINE\ (ft)+H\ SINE\ (ft)]e-((C+E)/2m)t\}-((C+E)dA/dt)+mg$. The total mechanical force F1 before time to has a value of $Fh-kAo-((C)dA/dt)$. F2 is a Newtonian force of motion and is equal to m times the second derivative of deflection vector A. A1 is the maximum displacement of the rotor and is the same as the maximum displacement that is shown in FIG. 3. Time t is measured from the value Ao on the verticle axis shown in FIG. 3.

A magnetic field B is dynamically applied by electromagnet 24 to magnetic rotor 10, in a direction opposite to the direction of motion of rotor 10. B is made equal to $-G(dA/dt)$. G is a constant that is determined by the amount of current being sent into electromagnet 24. dA/dt is the velocity of the rotor 10.

The magnetic force Fb on rotor 10 is equal to (h) (B1)(B) for small values of A as compared to Do. (h) is a physical constant. The magnetic field vector produced by rotor 10 is B1. B1 is the magnitude of B1. $Fb=-(h)\ (B1)\ G\ (dA/dt)=-E\ dA/dt$. Thus $E=(h)\ (B1)\ (G)$ Electromagnet 24 dynamically applies magnetic caging force Fb to magnetic rotor 10, in a direction opposite to the direction of motion of the rotor 10. Work is done on rotor 10. Rotor 10 slows down. The mechanical energy of rotor 10 is decreased as rotor 10 moves a distance dA through magnetic force field B.

Again, the electromagnet 24 produces a magnetic caging force Fb on magnetic rotor 10. The magnetic, force Fb is made of oppose the direction of motion of rotor 10, in order to slow the rotor 10 down. The magnetic force Fb is a function of the magnetic field strengths of electromagnet and rotor 10.

The magnetic force Fb between electromagnet 24 and rotor 10 is equal to (h) (B1)(B) for small displacements of rotor 10. This caging force Fb is used in order to cage rotor 10 after it is bumped.

The total force on rotor 10 is $Fh\ -k\{[A0\ COSINE\ (ft)+H\ SINE\ (ft)]e-((C+hB1G)/2m)t\}+mg$ after Fb is applied to rotor 10. $H=[P+(A0((C+hB1G)/2m))]/[(f)]$.

Electromagnet 24 will be made to generate a magnetic field B. The strength B of the magnetic field B of electromagnet 24 is decreased as rotor 10 looses velocity. B is made to be adjustibly proportional to deflection velocity dA/dt by adjusting G.

The rotor 10 is magnetized and produces a constant magnetic field strength vector B1 having strength B1. Magnetic caging force Fb is produced between rotor 10 and electromagnet 24. The coefficent E of the caging force Fb equals (h) (B1) (G). The direction of the magnetic field B of the electromagnet 24 is made to oppose the direction of motion of rotor 10. The magnetic field B is generated by electromagnet 24 after the velocity dA/dt, of rotor 10, is determined. The strength of magnetic field B is directly proportional to the magnitude of velocity dA/dt and to magnetic caging coefficient G.

The magnetic field B is initially made to point upward, as rotor 10 moves downward, due to force Fh. The rotor 10 is made to be magnetically repulsed by electromagnet 24. The initial upward magnetic field B will produce an initially upward caging force Fb. The initial upward caging force Fb is adjusted so that the total force, $Fh+Fb+Fs+Fc+Fg$ is slightly negative, to slow down and stop rotor 10 from moving downward. The total force FT thus points upward in order to bring rotor 10 back to its rest position. The rotor 10 deaccelerates.

After a caging magnetic force Fb is applied to rotor 10 the deflection A of rotor 10 decreases more quickly with time. The mechanical force FT on rotor 10 decreases as the maximum value of deflection vector A decreases. The mechanical energy of rotor 10 decreases to zero as the maximum value of deflection A decreases to zero. As Fh decreases, Fb is decreased. After Fh reaches zero, Fb is decreased to zero as the maximum value of deflection vector A decreases to zero.

The magnetic field produced by electromagnet 24 is made to have a strength B, around electromagnetic 24, such that the value of $Fb+Fs+Fc$ is slightly greater than the value of $Fh+Fg$. G is adjusted so that $Fb+Fs+Fc$ is slightly greater than $Fh+Fg$.

If the initial caging force Fb on rotor 10 is made much greater than the forces $Fh+Fc+Fs+Fg$ on rotor 10, the rotor does not oscillate in moving to its rest position. Rotor 10 moves directly to its rest position. Heavy caging thus occurs.

If the initial caging force Fb on rotor 10 is made moderately greater than the forces $Fh+Fc+Fs+Fg$ on rotor 10, the rotor oscillate slightly in moving to a rest position. Moderate caging thus occurs.

If the initial force Fb on rotor 10 is made slightly greater than the forces $Fh+Fc+Fs+Fg$ on rotor 10, the rotor will oscillate moderately in moving to a rest position. Light caging thus occurs.

As shown in FIG. 7, as the magnetized rotor 10 moves downward, the caging force Fb and the magnetic field vector B of electromagnet 24 are made to point upward. Electromagnetic 24 initially repulses rotor 10. The magnetic field of electromagnet 24 is applied upward so that force Fb opposes the downward direction of motion of rotor 10.

As rotor 10 moves upward past its rest position, the force Fb and magnetic field vector B are applied downward to rotor 10. This occurs after Fh is zero, that is, there if no hitting force.

As magnetized rotor 10 begins to move downward from its top most position, magnetic field vector B of electromagnet 24 and force Fb are again made to point upward. The field from electromagnetic 24 magnetically repulses magnetic rotor 10. An upward magnetic force Fb is produced. The upward magnetic force Fb is in a direction opposite to the downward direction of the motion of rotor 10.

As rotor 10 moves downward past its rest position the force Fb and magnetic field B continue to be applied upward.

The direction and magnitude of current I, through electromagnet 24, is under control of computer 26 of caging system 8. The computer 26 controls whether the magnetic field vector B is pointing upward or downward and adjusibly controls the strenght of magmetic field B. The computer controls the strength of magnetic field B, generated by electromagnet 24, by controlling G. That is, B equals $-G(dA/dt)$. The computer 26 controls the direction of the magnetic field vector B generated by electromagnet 24, in response to a determination by computer 26 of the direction of motion of rotor 10.

When computer 26 determines that rotor 10 is moving upward, computer 10 draws a current out of electromagnet 24 to make the generated magnetic field vector B point downward. When computer 26 determines that rotor 10 is moving downward, computer 10 sends a current into electromagnet 24 to make the generated magnetic field vector B point upward.

The rotor 10 has a magnetic field strength B1, at a location adjacent rotor 10. The strength, B1, of the magnetic field of rotor 10, is selected by trial and error. The magnetic field vector B1 of rotor 10 is pointing downward.

The kinetic energy of rotor 10 decreases with movement according to the function $(Fb+Fc)(DeltaA)$. (Delta A) is an amount of distance that rotor 10 moves through the magnetic field vector B of electromagnet 24, in a period of time Delta t. The more distance, A, that rotor 10 moves through the magnetic field B of electromagnet 24, the more the rotor's total mechanical energy decreases.

Detector 22 detects a signal, such as a capacitive signal, to determine deflection vector A. Detector 22 receives the capacitive signal from rotor 10. By measuring the strength of the capacitive signal, detector 22 can sense the distance S between detector 22 and rotor 10.

Vector distances S1, S2, S3 et cetera, between detector 22 and rotor 10, are measured at times t1, t2, t3 et cetera, by detector 22. Delta A is $S2-S1$. Delta t is $t2-t1$. Then $dA/dt$ equals Delta A/Delta t. Vector distances S1, S2, S3, et cetera, are referred to as distance readings.

Computer 26 accepts distance readings S1, S2, S3 etc. from detector 22. The computer 26 calculates the amount and direction of deflection velocity vector $dA/dt$, based on these distance readings at perodic intervals of time. A positive sign of deflection velocity vector $dA/dt$ indicates the rotor 10 is moving toward from electromagnet 24.

Computer 26 drives power supplies 28 and 30. A positive sign of $dA/dt$ from computer 26 indicates that rotor 10 is moving away from detector 22. A positive sign for $dA/dt$ causes diode 29 to conduct, to activate power supply 30. Power supply 30 sends a current I to electromagnet 24. Current. I produces magnetic field vector B, where B equals $-G\, dA/dt$. G is selected based on the level of caging desired. Portion 18 of rotor 10 is repulsed by the magnetic field vector B, produced by electromagnet 24. A negative sign for $dA/dt$ from computer 26 causes diode 27 to conduct to activate power supply 28. Power supply 28 draws a current I from electromagnet 24. Portion 18 of rotor 10 is attacted by the magnetic field vector B, produced by electromagnet 24. Power supplies 28 and 30 are together an example of an energizing means for energizing caging means 24.

The power supplies 28 and 30 will energize electromagnet 24 with a current I that is equal to the product of the deflection velocity vector, $(dA/dt)$, of rotor 10 and to the selected gain Q. An adjustment within the power supplies 28 and 30 is used to adjust Q and thus to adjust the level of output electrical current I produced by power supplies 28 and 30 in reaction to a signal $dA/dt$ from computer 26. I denotes a vector direction of the electrical current. $I = -Q\, dA/dt$. Q is an adjustible gain within power supplies 28 and 30. Q is adjusted to provide a desired strength for caging force Fb. I has a level that is dependent on the current velocity of rotor 10. The value of Q can be dynamically controlled by computer 26 or by manual setting.

$B = KI$. K is linearly proportionality constant that depends on the construction of electromagnet 24. Thus $G = KQ$. Thus to adjust G one would adjust the gain Q of each of power supplies 28 and 30.

The electromagnet 24 pulls on the magnetic rotor 10, with a caging force coefficient value $E = (h)(B1)(K)(Q)$, that is adjustibly proportional to the current deflection velocity of the rotor 10, when rotor 10 is moving away from electromagnet 24. The electromagnet 24 pushes on the magnetic rotor 10, with a caging force coefficient value $E = (h)(B1)(K)(Q)$, that is adjusibly proportional to the current deflection velocity of the rotor, when rotor 10 is moving toward electromagnet 24. Again B varies in adjustibly proportional to deflection velocity $dA/dt$.

The field vector B from electromagnet 24 opposes hitting force Fh and decreases the velocity of the magnetic rotor 10. The electromagnet 24 thus quickly centers the rotor 10 above motor 12.

FIG. 7 shows the caging system 8 for a first plane. There could be the same or a similar type of caging system for a perpendicular plane to the plane of FIG. 7.

Figure 8:
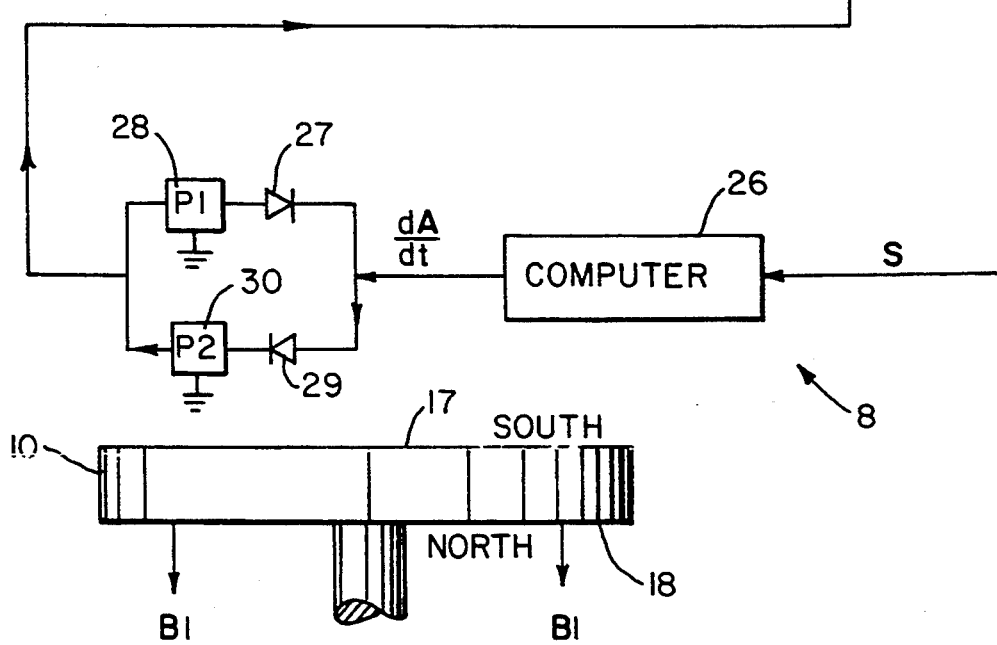
FIG. 8 is perspective view of a magnetic rotor of FIG. 7.

FIG. 8 shows magnetic rotor 10 is greater detail. Rotor 10 is magnetized in order to interact with an electromagnetic field of electromagnet 24 of FIG. 7. The rotor 10 is magnetized in a direction such that the lower portion 18 is a north magnetic pole type and the upper portion 17 is a south magnetic pole type. The electromagnet 24 can be made to attract or repulse the lower portion 18 of the rotor 10.

In an alternate embodiment, if the rotor 10 were magnetized such that the lower portion 18 is a south magnetic pole, current I would then be sent into electromagnet 24 when rotor 10 is moving away from electromagnet 24. Electromagnet 24 would thereby attract rotor 10. Further, the current I would be drawn out of electromagnet 24 when rotor 10 is moving toward electromagnet 24, in order for electromagnet 24 to repulse rotor 10. The power supplies 28 and 30 would therefore have to be interchanged from their positions shown in FIG. 7.

If an unmagnetized rotor is used in place of magnetized rotor 10, an electromagnet 24 would be placed below the rotor and another electromagnet would be placed above the unmagnetized rotor. When the unmagnetized rotor is moving upward electromagnet 24 would be used to attract the rotor. When the unmagnetized rotor is moving downward the other electromagnet would be used to attract the rotor. The electromagnet 24 and the other electromagnet would be made to produce a caging force Fb that opposes the direction and amount of motion of an unmagnetized rotor, to slow the rotor and allow it to be caged.

The electromagnet 24 could be replaced by an electrostatic caging device. The magnetized rotor 10 would be replaced by an electrostatically charged rotor. An electrostatic caging force could be remotely applied by an electrostatic device to the electrostatically charged rotor. The electrostatic caging force would cage the electrostatically charged rotor. The electrostatic caging force would be made to oppose the direction of motion of the rotor, with respect to the electrostatic device, and allow the rotor to be caged. The strength of the electrostatic caging force would be adjustibly proportional to the velocity of the rotor. The strength of electrostatic caging would be selected to a damping level.

The electromagnet 24 could be replaced by gas pressure caging devices above and below the rotor. The magnetized rotor 10 could be replaced to be an unmagnetized rotor. The force of a damping gas, from the gas pressure damper, would be remotely applied by the gas pressure caging device to the unmagnetized rotor. The force of the damping gas would be made to oppose the direction of motion of the rotor, when the rotor is moving toward the gas pressure device. The strength of the force would be proportional to the velocity of the rotor and to the desired damping level.

Two degree of freedom gyro caging can be described by considering the rotor 10 connected to a motor 12 with a flexible shaft 14 of FIG. 7. Naturally the flexible shaft has spring-like deflection properties. This shaft, or flex joint, is actually a complex structure, so constructed that at the operating rotor speed (240 rps) its spring characteristics disappear. At zero rotor speed, however, the spring is quite evident and the slightest disturbance will set the rotor 10 bobbing back and forth about its midpoint.

Caging the rotor 10 at zero rotor speed is a straightforward control problem. The flex joint spring 15 is nearly iso-elastic so there is little cross coupling and the two axes can be treated as independent single input-single output systems. Each axis could have a caging means and position sensor so the plant is both controllable and observable. Of course since the shell has no angular momentum there is no gyroscopic action and a caging means, which customarily is used to control one axis, will not have an effect on the other.

Figure 9:
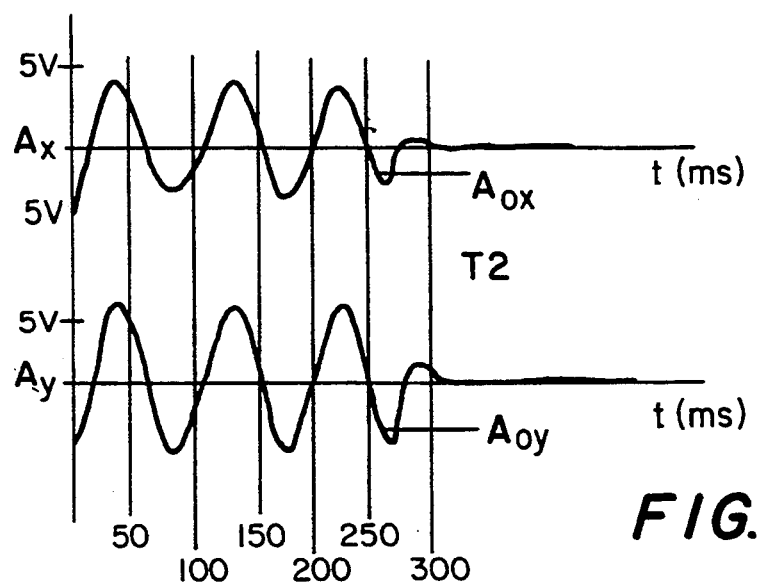
FIG. 9 are traces of deflections of a gyro rotor in two orthogonal planes during caging of the gyro rotor.

A response for a gyro in a two axis caging system, that is an extension of the one axis caging system of FIG. 7, is shown in the curves of FIG. 9. The loop sample rate is 300 Hz and the gyro torquer motor 120 was driven with the ±15 volt output of a D/A converter. Two caging means were used for stabilization in two orthogonal planes, to produce the two outputs shown in FIG. 9. Only one caging means is shown in FIG. 7, for stabilization in the plane of the Figure, in FIG. 7.

FIG. 9 shows the caging response for two planes, including the plane coming out of the paper for the arrangement of FIG. 7. After the caging system of FIG. 7 has been activated, the gyro case can be rocked back and forth about the simulator axis pretty vigorously without the rotor 10 hitting the stops. A conservative estimate is that rocking rates on the order of 1 revolution per second would be needed to force the rotor 10 into the stops. Outputs of gyro pick-offs are shown in FIG. 9 using 5 volts and 50 ms per division. The shell is not spinning; the gyro rotor 10 has been excited by a mechanical impulse and is rocking back and forth through null at 10.5 Hz. The caging system 8 is activated at a point just past midscreen. Moderate retardation force is applied.

While the present invention has been disclosed in connection with the preferred embodiment thereof, it should be understood that there may be other embodiments which fall within the spirit and scope of the invention as defined by the following claims.

What is claimed is:

1. A caging system that cages a moving body, comprising:
    (a) means for remotely detecting amounts of movement of the body over time;
    (b) means for determining an instantaneous linear deflection velocity of the body from such detected amounts of linear movement of the body over time; and
    (c) means remote from the body for directly applying a caging force to the moving body in a direction opposite to a direction of linear movement of the moving body, the magnitude of the caging force being equal to a selected value of caging coefficient times the instantaneous linear deflection velocity of the moving body, the caging force changing a linear position of the body.

2. The caging system of claim 1 wherein the means for determining an instantaneous linear deflection velocity of the moving body comprises a computer means.

3. The caging system of claim 1 wherein the means for determining an instantaneous linear deflection velocity of the moving body comprises a computer means that processes detected amounts of linear movement over time.

4. The caging system of claim 1 wherein the means for remotely detecting amounts of linear movement of the moving body is a capacitive means.

5. A caging system that cages a moving rotor of a gyro, comprising:
   (a) means for remotely detecting amounts of linear movement of the rotor over time;
   (b) means for determining a instantaneous linear deflection velocity of the rotor from such detected amounts of linear movement of the rotor over time; and
   (c) means remote from the rotor for directly applying a caging force to the rotor in a direction opposite to a direction of linear movement of the rotor, the magnitude of the caging force being equal to a selected value of caging coefficient times the instantaneous linear deflection velocity of the moving rotor, the caging force changing a linear position of the rotor.

6. The caging system of claim 5 wherein the means for determining instantaneous linear deflection velocity of the rotor comprises a computer means.

7. The caging system of claim 5 wherein the means for remotely applying a caging force to the rotor comprises an electromagnetic caging means.

8. The caging system of claim 5 wherein the rotor is a magnetic rotor and the means for remotely applying a caging force to the magnetic rotor comprises an electromagnetic caging means.

9. The caging system of claim 5 wherein the means for remotely applying a caging force comprises a caging means that is energized by an energizing means.

10. A caging system that cages a rotor that is deflected on a flexible springy shaft of a gyro assembly, comprising:
    (a) detector means for remotely measuring linear deflections of a rotor over time;
    (b) computer means for determining instantaneous linear deflection velocity of the rotor from such measured linear deflections over time and for driving power supply means proportionally to the instantaneous linear deflection velocity of the rotor;
    (c) power supply means for energizing a caging means proportionally to the instantaneous linear deflection velocity of the rotor; and
    (d) caging means remote from the rotor for directly applying a caging force to the rotor in a direction opposite to linear movement of the rotor, the caging force changing a linear position of the rotor.

11. A caging system that cages a rotor that is deflected on a flexible springy shaft of a gyro assembly, comprising:
    (a) a rotor;
    (b) deflection detector means for remotely measuring deflections of the rotor over time;
    (c) computer means for determining instantaneous linear deflection velocity of the rotor from such measured deflections over time and for driving power supply means proportionally to the instantaneous linear deflection velocity of the rotor;
    (d) power supply means for energizing caging means proportionally to the instantaneous linear deflection velocity of the rotor; and
    (e) caging means remote from the rotor for directly applying a caging force to the rotor in a direction opposite to linear movement of the rotor, the caging force changing a linear position of the rotor.

12. A caging system that cages a magnetized rotor that is deflected on a flexible shaft of a gyro assembly, comprising:
    (a) a magnetized rotor;
    (b) a deflection detector for remotely and electrically detecting amounts of linear deflection of the magnetized rotor over time;
    (c) computer means for calculating instantaneous linear deflection velocity of the magnetized rotor, including determining direction of linear motion of the magnetized rotor, the computer means using the detected amounts of linear deflection over time;
    (d) electromagnetic caging means remote from the rotor for directly applying a magnetic caging force to the magnetized rotor in a direction opposite to the determined direction of linear motion of the magnetized rotor, the strength of the magnetic caging force being proportional to the instantaneous linear deflection velocity of the rotor, the magnetic caging force changing a linear position of the magnetized rotor; and
    (e) power supply means, driven by the computer means proportionally to the instantaneous linear deflection velocity of the rotor, for energizing the electromagnetic caging means proportionally to the linear deflection velocity of the rotor to produce said magnetic caging force.

* * * * *